United States Patent Office 3,056,535
Patented Oct. 2, 1962

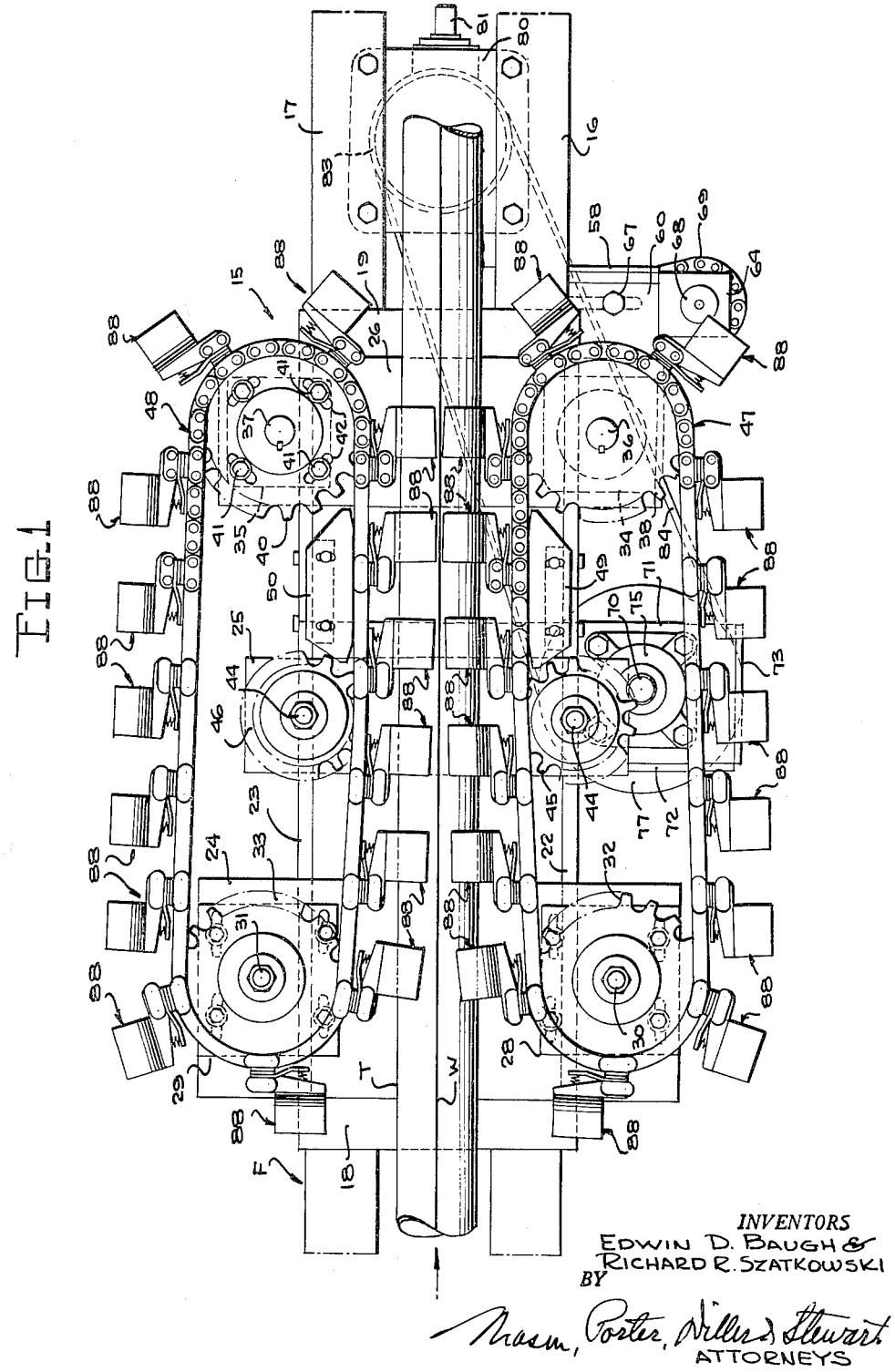

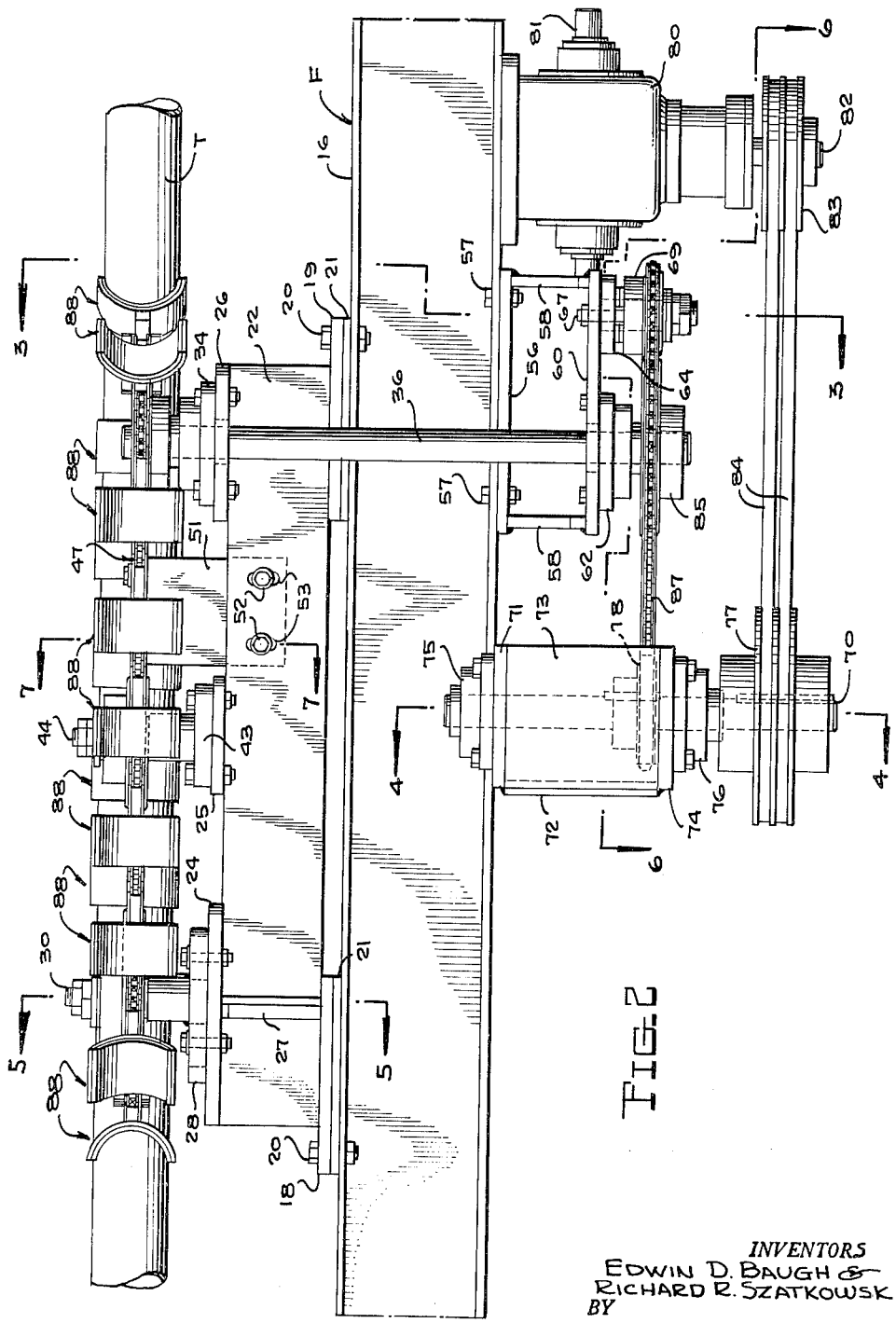

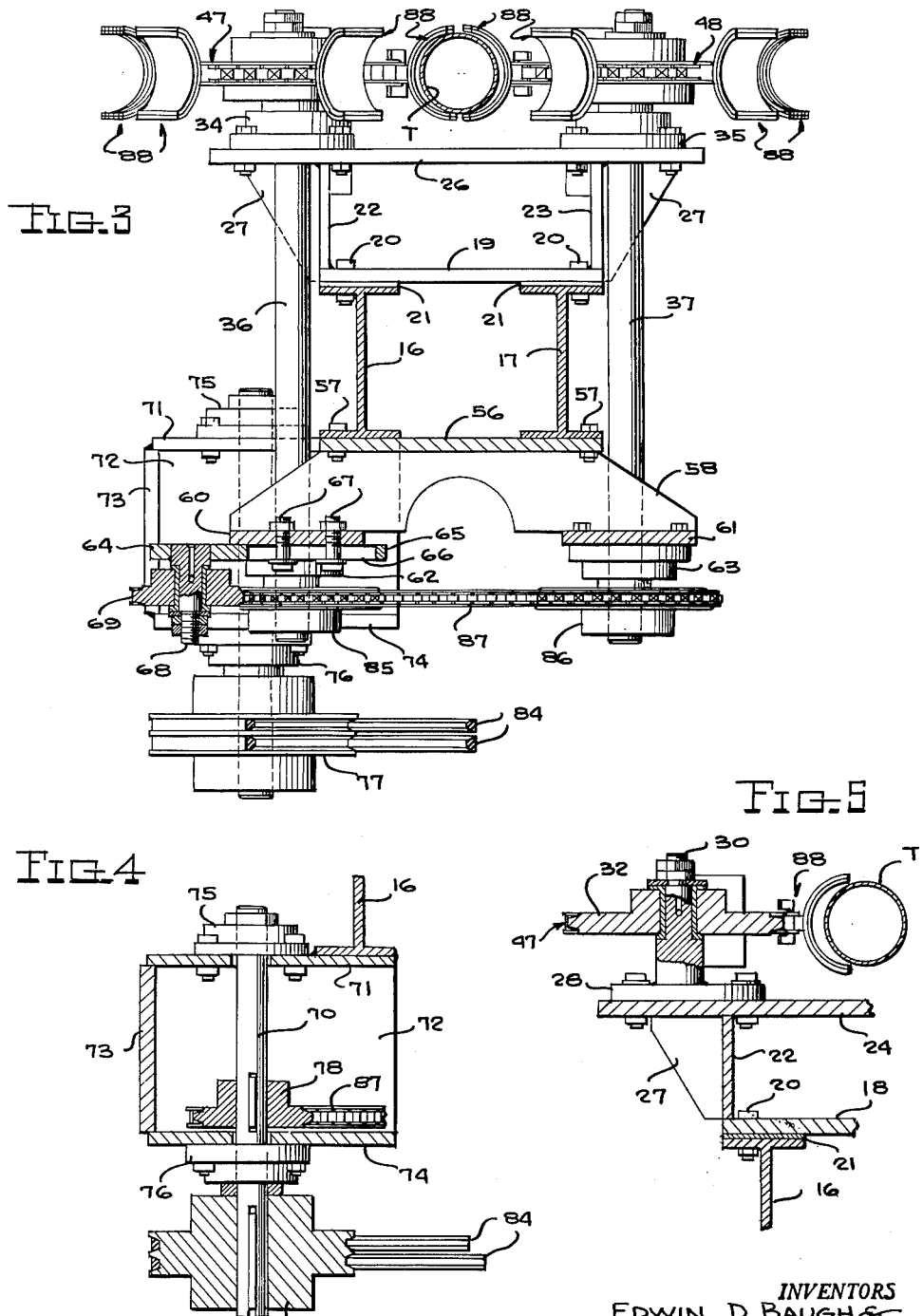

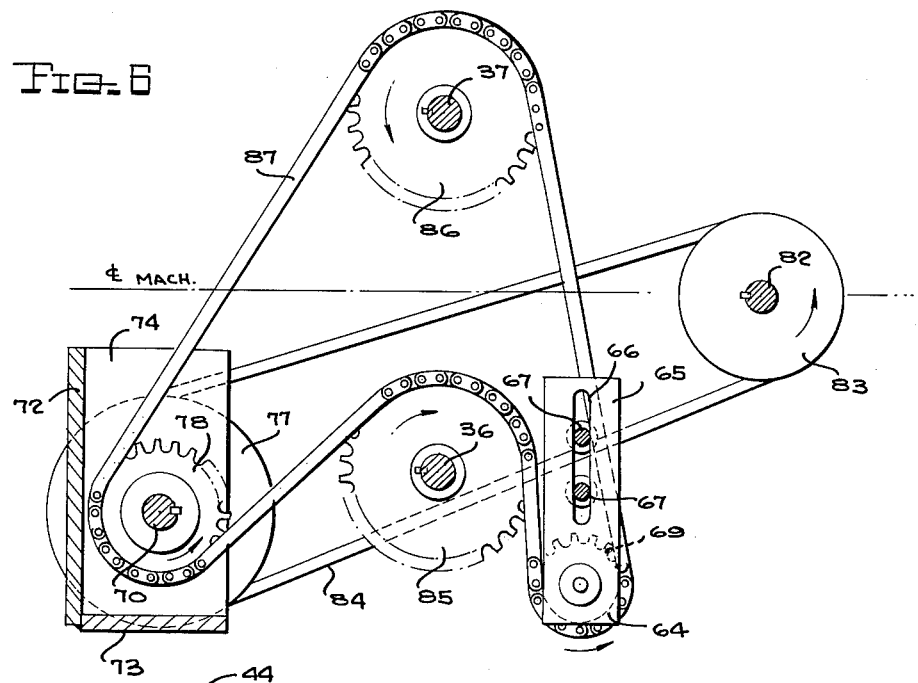
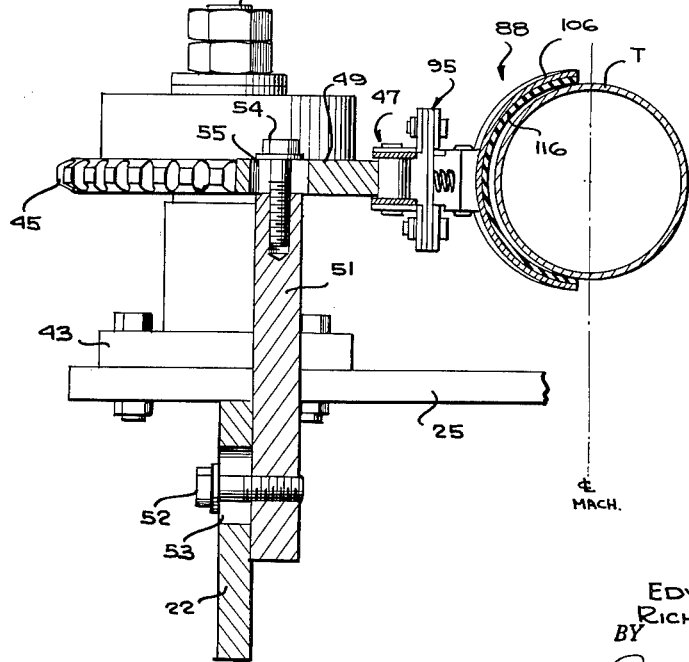

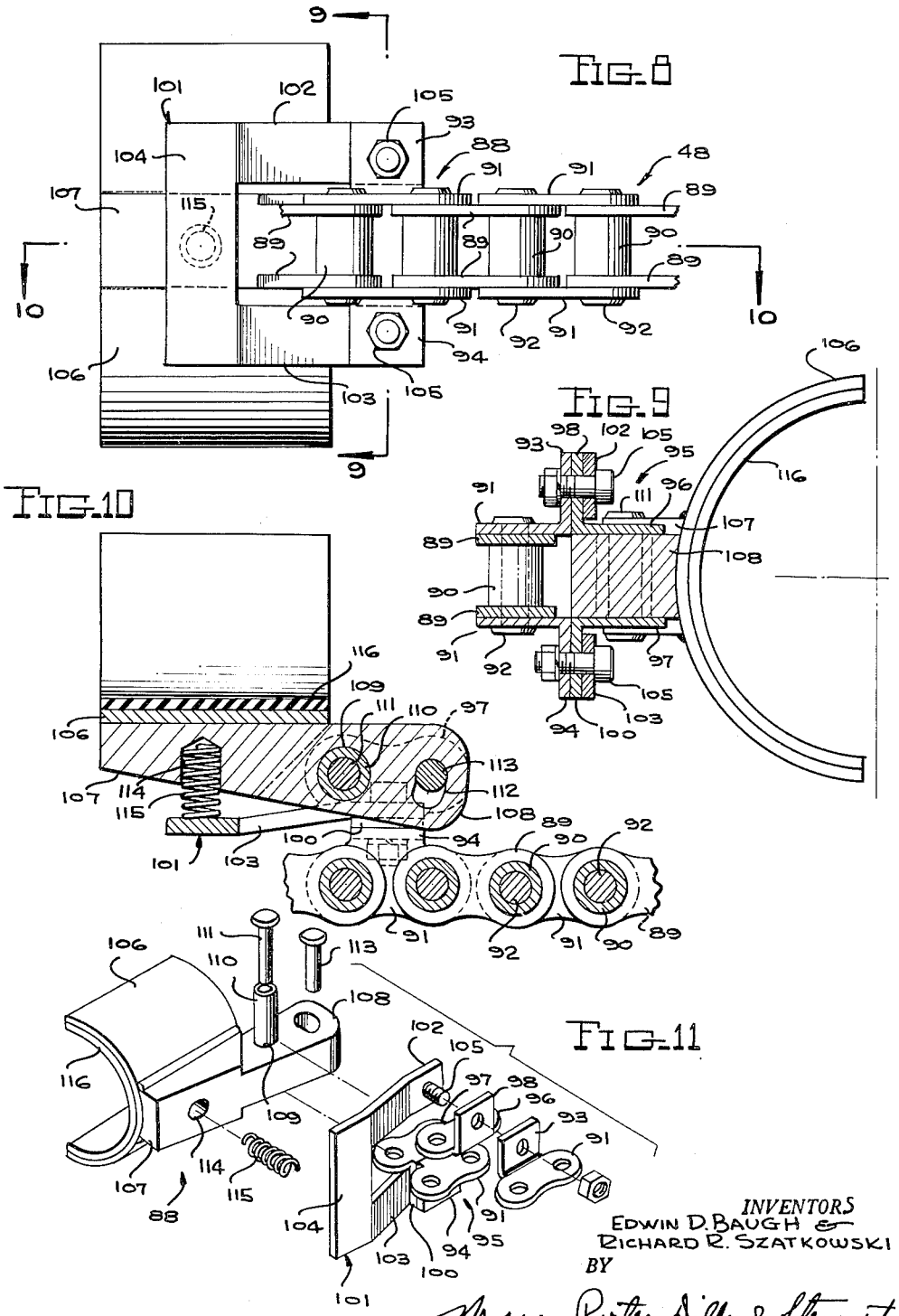

3,056,535
TUBE PULLING MECHANISM FOR CONTINUOUS WELDING MACHINES
Edwin D. Baugh, Western Springs, and Richard R. Szatkowski, Hazelcrest, Ill., assignors to Continental Can Company, Inc., New York, N.Y., a corporation of New York
Filed May 24, 1960, Ser. No. 31,320
15 Claims. (Cl. 226—172)

This invention relates in general to new and useful improvements in the mechanical feeding art, and more specifically relates to a novel tube driving mechanism which may drive a tube at a constant rate as is required, for example, in continuous welding machines.

At the present time, it is proposed to provide thin wall tubes having a continuous welded seam for use in the forming of can bodies, the tubes being separated at regularly spaced intervals after the completion of the welding operation. These tubes will have a wall thickness ranging from 0.004 to 0.015 inch and must be moved at a constant high rate. It is envisioned that the tube may have to be moved as fast as 1,000 feet per minute, and even higher speeds, up to 2,000 feet per minute. At the same time, it is necessary that the tube be so engaged whereby the pressure exerted thereon circumferentially thereof be relatively light to prevent crushing of the tube due to the thinness of its walls. In addition to this, the tube may be scored at the intervals at which it is to be broken apart, and thus an uneven circumferential pressure thereon would have a tendency to break the tube along the score lines.

In the welding operation, the material from which the tube is formed is provided in coil form and is shaped into the tubular shape by drawing it through suitable guides prior to the welding operation. Since the tube cannot be conveniently fed prior to the forming and welding thereof, it is necessary that the tube driving mechanism apply a sufficient force to the tube to pull it through the guiding and welding equipment. At the same time, as stated above, it is necessary that the tube be uniformly gripped when this force is being applied to prevent the undue distortion and breaking thereof.

In view of the foregoing, it is the primary object of the invention to provide a tube driving mechanism which includes a pair of endless chains disposed in a common plane and having opposed runs, and the endless chains carrying a plurality of jaws, the movement of the chains being in timed relation with jaws of the two drive chains extending along the opposed runs being disposed in mating opposed relation, and the jaws being mounted on the drive chains in a manner to permit a firm, yet uniform, gripping action on the tube.

Another object of the invention is to provide a novel tube driving mechanism which includes a pair of endless chains having opposed runs and the endless chains carrying cooperating jaws, the jaws being pivotally mounted and spring urged into engagement with a tube passing therebetween to assure proper engagement of the jaws with the tube, and the jaws being located in advance of their pivot points so that the resistance of the tube to movement by the jaws results in the pivoting of the jaws towards the tube to increase the frictional pressure between the jaws and the tube.

Another object of the invention is to provide a tube driving mechanism which includes a plurality of pairs of jaws wherein the jaws of each pair are carried by different drive chains and cooperate with each other to firmly grip a tube being moved thereby, and the jaws being provided with resilient coverings which engage the tube to both prevent damage to the tube and to prevent slippage of the tube within the jaws.

A further object of the invention is to provide a novel mounting for jaws on endless drive chains in a tube pulling mechanism, each of the jaws being carried by an elongated support which is pivotally mounted on an associated chain link, the support additionally being provided with means urging the jaw away from its respective drive chain and stop means for limiting the swinging movement of the jaw support relative to the drive chain, wherein the jaw is resiliently urged into engagement with a tube and at the same time, movement of the jaw is restricted by the stop means to retain the jaw at a proper angle for engagement with the tube and to prevent excessive pivoting of the jaw when engaged with the tube to unduly deform or crush the tube.

Still another object of the invention is to provide a novel tube driving mechanism which includes a pair of endless drive chains disposed in a common plane and having opposed runs, the drive chains each supporting a plurality of jaws and the jaws being mounted on the two drive chains with equal spacing and the two drive chains being driven at the same speed so that jaws of the two drive chains will be disposed in mating cooperating relation as they pass along the opposed runs, the opposed runs including first portions which are initially widely spaced and converge together, and second portions which are disposed in parallel relation so that the jaws progressively move into engagement with a tube during the first portions of the run and tightly grip the tube during the second portions of the run to effect the movement of the tube as desired.

With the above, and other objects in view that will hereinafter appear, the nature of the invention will be more clearly understood by reference to the following detailed description, the appended claims, and the several views illustrated in the accompanying drawings.

In the drawings:

FIGURE 1 is a plan view of the tube driving mechanism, and shows the over-all layout of the various components thereof.

FIGURE 2 is an elevational view of the tube driving mechanism, and shows further the relationship of the components thereof.

FIGURE 3 is a fragmentary vertical sectional view, taken along the section line 3—3 of FIGURE 2, and shows the general details of the supporting structure for the tube driving mechanism.

FIGURE 4 is a fragmentary vertical sectional view, taken along the line 4—4 of FIGURE 2, and shows the details of one of the main drive shafts.

FIGURE 5 is a fragmentary vertical sectional view, taken along the line 5—5 of FIGURE 2, and shows the mounting of one of the sprockets for one of the drive chains.

FIGURE 6 is a fragmentary horizontal sectional view, taken along the line 6—6 of FIGURE 2, and shows the specific details of the drive for the tube driving mechanism.

FIGURE 7 is an enlarged fragmentary vertical sectional view, taken along the line 7—7 of FIGURE 2, and shows the specific details of mounting of a guide for the drive chain at the time it is firmly engaged with the tube, the relationship of the tube with respect to one of the jaws also being shown.

FIGURE 8 is an enlarged fragmentary elevational view showing the relationship of one of the jaws with respect to its respective drive chain.

FIGURE 9 is an enlarged fragmentary vertical sectional view, taken along the line 9—9 of FIGURE 8, and shows the specific connection between the jaw and the drive chain.

FIGURE 10 is an enlarged fragmentary horizontal sectional view, taken along the line 10—10 of FIGURE 8, and shows further the details of the mounting of the jaw with respect to its respective drive chain.

FIGURE 11 is an enlarged fragmentary exploded perspective view, showing the specific details of mounting of one of the jaws.

In accordance with the invention, it is proposed to drive a welded tube T which is formed of very light gauge metal, the wall thickness of the tube T ranging generally from 0.004 inch to 0.015 inch, although the wall thickness of the tube T may be greater. The tube T has a welded seam W which extends the full length thereof. Further, the tube T may be provided at spaced intervals with score lines (not shown) which weaken the tube transversely of its length to facilitate the breaking of the tube into a plurality of short lengths, which short lengths may be used as can bodies or for other purposes not part of this invention.

The present invention relates to a driving mechanism for driving the tube T longitudinally of its length, the tube driving mechanism being generally referred to by the numeral 15. The tube driving mechanism 15 is mounted on a supporting frame F, which supporting frame may run the full length of an entire tube forming mechanism, with the tube driving mechanism 15 being only a small part of the over-all mechanism. The frame F includes a pair of longitudinally extending I-beams 16, 17, which are disposed in spaced parallel relation.

A pair of transverse plates 18, 19 extend across the upper portions of the I-beams 16, 17 and connect the two together. The plates 18, 19 are secured to the I-beams 16, 17 by means of suitable fasteners 20 and, when necessary, shims 21 are placed between the plates 18, 19 and the I-beams 16, 17 to obtain the necessary vertical adjustments of the plates 18, 19.

As is best shown in FIGURES 2 and 3, a pair of longitudinally extending upright plates 22, 23 extend between the plates 18, 19 and are secured thereto, as by welding, on the upper surfaces thereof and at the opposite ends thereof.

The upper edges of the upright plates 22, 23 are connected together at spaced intervals by transversely extending plates 24, 25 and 26. The plates 24, 25 and 26 all extend beyond the upright plates 23, as is best shown in FIGURE 3, and are suitably secured to the upright plates 22, 23, as by welding. The plate 24 is additionally supported by suitable gussets 27 which are secured to the outer faces of the upright plates 22, 23 and to the underside of the plate 24 adjacent opposite ends thereof.

The plate 24 is disposed at the left end of the upright plates 22, 23, as viewed in FIGURE 2. The plate 24 carries a pair of bearing assemblies 28, 29 which carry upright shafts 30, 31, respectively, which shafts are spaced equidistant on opposite sides of the center line of the tube T. The shaft 30 supports for rotation an idler sprocket 32. The shaft 31 supports for rotation a similar idler sprocket 33.

The plate 26 is not as wide as the plate 24, as is shown in FIGURE 2, but is of a sufficient width to support a pair of bearing assemblies 34, 35, as is best illustrated in FIGURE 1. The bearing assemblies 34, 35 are fixedly secured to the plate 26 whereas the bearing assemblies 28, 29 are adjustably secured to the plate 24 for longitudinal movement to permit an adjustment thereof, as may be required for reasons to be described in detail hereinafter. The bearing assemblies 34, 35 support the upper ends of drive shafts 36, 37, respectively. A sprocket 38 is fixedly secured to the upper end of the drive shaft 36 for rotation therewith. A sprocket 40 is fixedly secured to the upper end of the drive shaft 37 for rotation therewith. However, the sprocket 40 is adjustable with respect to the shaft 37 and is adjustably connected thereto by means of fasteners 41 which extend through arcuate slots 42 in the sprocket 40.

The plate 25 is disposed intermediate the plates 24 and 26 and is relatively narrow. Bearing assemblies 43 are mounted on the plate 25 at opposite ends thereof. The bearing assemblies 43 have upwardly projecting shafts 44 on which intermediate idler sprockets 45, 46 are positioned for rotation.

It is to be noted that the sizes and positions of the sprockets 32, 33, 45, 46, 38 and 40 are such that the opposed surfaces of the sprockets 32, 33 are widely spaced, as compared to the opposed surfaces of the sprockets 45, 46, and the sprockets 38, 40, and that the spacing between the opposed surfaces of the sprockets 45, 46 is the same as that between the opposed surfaces of the sprockets 38, 40. This is clearly shown in FIGURE 1.

A drive chain 47 is entrained over the sprockets 32 and 38 and bears against the sprocket 45. An identical drive chain 48 is engaged over the sprockets 33 and 40 and is engaged with the sprocket 46. The drive chains 47, 48 have opposed runs, and first portions of these runs, starting from the left and proceeding to the right, as viewed in FIGURE 1, converge and second portions of the runs are disposed in parallel relation. The purpose of this relationship will be set forth in detail hereinafter. At this time, however, it is pointed out that the adjustable mounting of the bearings 28, 29 permits the slack in the drive chains 47, 48 to be taken up, as may be required.

The drive chain 47 has an outwardly directed pressure exerted thereon intermediate the sprockets 45 and 38. In order to prevent the outward movement of the drive chain in this area, there is provided a combination guide and back-up member 49. This member extends substantially between the sprockets 45 and 38 and has a face thereof in alignment with the path of movement of the inner surface of the adjacent portion of the run of the drive chain 47. A similar combined guide and back-up member 50 is mounted between the sprockets 46 and 40 and supports the drive chain 48 against outward movement between the sprockets 46 and 40. The mounting of the two members 49 and 50 is identical.

Reference is now made to FIGURE 7, wherein the specific details of the mounting of the combined guide and back-up member 49 are illustrated. A support plate 51 is secured to the inner surface of the upper portion of the upright plate 22 intermediate the transverse plates 25 and 26. The plate 51 is secured to the plate 22 by means of bolts 52 which extend through vertically elongated slots 53 in the plate 22. In this manner, the plate 51 and the member 49 carried thereby are vertically adjustable so that the member 49 may lie in the plane of the drive chain 47. The member 49 rests on the upper edge of the plate 51 and is secured thereto by a pair of fasteners 54 which extend through transversely elongated slots 55 in the member 49. Thus, the member 49 may be shifted transversely of the axis of the tube T. In this manner, proper alignment of the guiding edge of the member 49 with the drive chain 47 is assured.

Reference is now made to FIGURES 2 and 3, wherein it is shown that a plate 56 extends across between the I-beams 16 and 17 and is secured to the undersides thereof by means of suitable fasteners 57. A pair of vertically disposed plates 58 are secured to the underside of the plate 56 adjacent opposite ends thereof, as by welding. The plates 58 are longer than the plate 56 and have the opposite ends thereof connected together by longitudinally extending plates 60, 61 which are secured to the lower edges of the plates 58, as by welding.

A bearing unit 62 is secured to the underside of the plate 60 in depending relation. The bearing unit 62 is disposed in alignment with the bearing unit 34 and serves to support the lower end of the drive shaft 36, which drive shaft is elongated. A bearing unit 63, which is similar to the bearing unit 62, is secured to the underside of the plate 61 in depending relation. The bearing unit 63 is disposed in alignment with the bearing unit 35 and supports the lower portion of the drive shaft 37.

The plate 60 also has suspended therefrom a bearing unit 64. The bearing unit 64 includes an elongated mount-plate 65 having an elongated slot 66 therein, the slot 66 being disposed transversely of the axis of the tube T. Suitable fasteners 67 extend through the slot 66 and adjustably mount the bearing unit 64. The bearing unit 64 includes a shaft 68 on which an idler sprocket 69 is journaled for rotation.

Reference is now made to FIGURES 2, 4 and 5 in particular, wherein the details of mounting of a drive shaft 70 are illustrated. A relatively short, transversely extending plate 71 is secured to the underside of the I-beam 16, as by welding. A transversely extending upright plate 72 is secured along the left edge of the plate 71, as viewed in FIGURE 2, as by welding. A longitudinally extending upright plate 73 is secured to the plate 71 along the outer edge thereof in depending relation. The plates 72 and 73 are disposed in angular relation and are suitably secured to each other along their abutting edges. A fourth plate 74 is disposed in underlying relation to the plate 71 and is secured to the lower edges of the plates 72 and 73, as by welding. An upper bearing unit 75 is secured to the upper surface of the plate 71. A lower bearing unit 76 is secured to the underside of the plate 74 in alignment with the upper bearing unit 75. The drive shaft 70 extends through the plates 71, 74 and is journaled in the bearing units 75, 76.

The drive shaft 70 extends downwardly below the bearing unit 76 and a drive pulley 77 is keyed thereon for rotation therewith. A drive sprocket 78 is keyed on the drive shaft 70 just above the plate 74.

As is best shown in FIGURE 2, a reduction gear unit 80 is secured to the undersides of the I-beams 16 and 17 in depending relation. The reduction gear unit 80 has an input shaft 81 and an output shaft 82, the output shaft 82 being disposed in parallel relation to the drive shaft 70. A drive pulley 83 is secured to the output shaft 82 for rotation and is disposed in alignment with the pulley 77. Drive belts 84 are entrained over the pulleys 83 and 77 and drivingly connect the pulley 77 to the pulley 83. It is to be understood that if desired the reduction gear unit 80 may be of the variable reduction ratio type so as to vary the speed at which the tube T is driven.

Referring now to FIGURE 6, it will be seen that a drive sprocket 85 is positioned on the lower end of the drive shaft 36. A similar drive sprocket 86 is mounted on the lower end of the drive shaft 37. A drive chain 87 is entrained over the drive sprocket 78. The drive chain 87 passes around the sprocket 86, then around the sprocket 69, around the sprocket 85, and then back to the sprocket 78. The position of the sprocket 69 is such so as to ensure proper engagment of the drive chain 87 with the sprocket 85. Also, the adjustable mounting of the sprocket 69 permits it to function as a slack adjusting idler. It is to be noted that although the sprockets 85, 86 are driven by the same drive chain 87, the resultant direction of rotation of the sprockets 85, 86 is different. This, of course, is necessary in order that the opposed runs of the drive chains 47, 48 move in unison in the same direction.

In order that the drive chains 47, 48 may drivingly engage the tube T, each of the drive chains 47, 48 is provided with a plurality of jaw assemblies, generally referred to by the numeral 88. It is to be noted that the jaw assemblies 88, as mounted on the drive chains 47, 48 are left and right, although it is to be understood that the drive chain 47 and its associated jaw assemblies 88 may be inverted end-for-end and positioned on the sprockets 33, 46 and 49 in lieu of the drive chain 48 and its jaw assemblies 88. Since the jaw assemblies 88 are identical, the details of only one jaw assembly will be described hereinafter.

Referring now to FIGURES 8 through 11, inclusive, it will be seen that there is illustrated the details of the drive chain 48 and its relationship to one of its respective jaw assemblies 88. It is to be understood that the drive chain 48 is identical with the drive chain 47. It is also to be understood that the drive chain 48 is of a conventional roller chain construction. However, it is necessary to understand the construction of the drive chain 48 in order to understand the mounting of each jaw assembly 88.

The drive chain 48 is formed of a plurality of repeating link assemblies. These link assemblies include a pair of inner link plates 89 which are spaced apart by tubular bushings or rollers 90. The ends of the inner link plates 89 are disposed closely adjacent to, but spaced from, ends of adjacent inner link plates 89. Adjacent inner link plates 89 are bridged by outer link plates 91. The outer link plates 91 carry pins 92 which extend through the inner link plates 89 and the bushings 90 and serve to secure the outer link plates 91 to the inner link plates 90 for relative pivotal movement.

At predetermined spaced intervals, the outer link plates 91 are provided with oppositely extending ears 93, 94. The ear 93 of each set of ears projects upwardly, while the ear 94 projects downwardly, the ears 93, 94 being disposed in a common vertical plane. The ears 93, 94 serve as means for mounting one of the jaw assemblies 88 onto the respective drive chain.

Each jaw assembly 88 includes a mounting bracket, generally referred to by the numeral 95. The mounting bracket 95 includes an upper plate 96 and a lower plate 97 which have projecting ears 98 and 100, respectively. The ears 98 and 100 extend in opposite directions and are disposed in a common vertical plane. At this time, it is pointed out that the plates 96, 97 are identical to the outer link plates 91 and, in fact, are outer link plates 91 having ears formed thereon. The ears 98 and 100 correspond to the ears 93 and 94, respectively. The mounting bracket assembly 95 also includes a generally C-shaped plate, generally referred to by the numeral 101. The C-shaped plate 101 has an upper leg 102 and a lower leg 103 connected together by an upstanding portion 104. As is best illustrated in FIGURE 10, it is to be readily apparent that the C-shaped plate 101 has a diagonally offset intermediate portion so as to offset the upstanding portion 104 from the remote ends of the legs 102, 103.

The legs 102, 103 have fasteners 105 extending from the remote ends thereof and the fastener 105 of the leg 102 passes through the ears 93 and 98, whereas the fastener 105 of the leg 103 passes through the ears 94 and 100. In this manner, the mounting bracket assembly 98 is assembled and is secured to its respective drive chain.

Each jaw assembly 88 also includes a jaw 106 which is of a semi-cylindrical configuration and which is carried by an elongated support 107. The jaw 106 is secured to its respective support 107 in any suitable manner, such as by welding. The support 107 has an end portion 108 of a reduced thickness, which end portion 108 is disposed between the plates 96, 97. That part of the end portion 108 disposed adjacent the jaw 106 has a bore 109 in which one of the bushings 110 is disposed. A pin 111 extends through the plates 96, 97 and the bushing 110 to pivotally mount the support 107 in the mounting bracket assembly 95. It is to be understood that the pin 111 is identical to one of the pins 92 and that the bushing 110 is identical to one of the bushings 90.

The end part of the reduced portion 108 remote from the jaw 106 is provided with a transversely elongated arcuate slot 112. A second pin 113 carried by the plates 96, 97 extends through the arcuate slot 112. It will be readily apparent that the pin 113, while it permits pivoting of the support 107 about the pin 111, limits such pivotal movement.

The portion of the support 107 aligned with the jaw 106 is provided with a bore 114 which is disposed generally normal to the jaw 106. A spring 115 is disposed within the bore 114 and projects outwardly therefrom. The projecting end of the spring 115 bears against the upright portion 104 of the C-shaped plate 101, with the spring urging the jaw 106 away from its respective drive chain. Movement of the jaw 106 away from the drive chain is limited to a position generally parallel to the drive chain by the pin 113.

It is to be noted that the inner surface of the jaw 106 is provided with a lining 116. The lining 116 is preferably formed of a resilient material, such as rubber or a rubber-like product. The purpose of the lining 116 is two-fold. First, it permits the resilient gripping of the thin walled tube T so as to prevent marring thereof. Secondly, it provides a good frictional contact with the surface of the tube T to thus provide the necessary friction required for driving the tube T by means of the jaws 106.

Reference is again made to FIGURE 1, wherein it is shown that the jaw assemblies 88 of the two drive chains 47 and 48 are arranged so that as the jaw assemblies move along the opposed runs of the drive chains 47, 48, they are disposed in cooperating pairs, the pairs being in perfect alignment. It is for this reason that the sprocket 40 is adjustably mounted on the drive shaft 37. It is also to be noted that the jaws 106 are disposed in advance of their pivot pins 111. Due to the fact that the first portions of the opposed runs of the drive chains 47, 48 are widely spaced and then converge, as the jaws 106 swing around the sprockets 32, 33, they clear the tube T. The jaws 106 then progressively move towards the tube T until such time as the chain links supporting them engage the intermediate sprockets 46, 45, at which time the jaws 106 are disposed in their closest relation and completely frictionally engage the tube T with a compressing of the springs 115. It is to be understood that the configuration of the inner surface of the lining 116 of each jaw 106 corresponds substantially to the external configuration of the tube T. As a result, there is no concentration of stresses on any part of the tube T within the jaws 106. On the other hand, the tube T is firmly gripped by the lining 116.

As is illustrated in FIGURE 1, the tube T is being moved from left to right. In effect, the jaws 106 are pushing the tube T in that the jaws 106 are disposed in advance of their pivot pins 111. Any resistance of the tube against movement together with the jaws 106 results in a relative movement of the tube T to the left as compared to the jaws 106. When the tube T attempts to move to the left, as compared to the jaws 106, the frictional engagement between the linings 116 and the tube T results in the pivoting of the jaws 106 away from the drive chains and towards the center of the tube T, with the result that the jaws more firmly grip the tube T. In other words, any resistance of the tube T against movement with the jaws 106 results in an increase in the gripping of the tube T by the jaws 106 and their linings 116. It is to be understood, however, that the pins 113 prevent the movement of the jaws 106 together to the extent that the tube T will be crushed or unduly deformed.

As is clearly shown in FIGURE 1, a minimum of two jaws 106 grip the tube T at all times. Of course, the spacing between the sprockets 45 and 38 and the sprockets 46 and 40 may be increased, if desired, to permit an additional number of jaws to be engaged with the tube T at all times.

From the foregoing, it will be seen that novel and advantageous provision has been made for carrying out the desired end. However, attention is directed to the fact that variations may be made in the example apparatus disclosed herein without departing from the spirit and scope of the invention, as defined in the appended claims.

What is claimed as new:

1. A tube driving mechanism for driving a thin wall tube subject to collapse and distortion from external pressures applied thereto, said mechanism comprising a pair of endless drive chains disposed in a common plane and having opposed runs, said runs having first portions disposed in converging relation and second portions disposed in parallel relation, means supporting and driving said drive chains in unison, and tube gripping means carried by said drive chains, said tube gripping means including a plurality of generally semi-cylindrical jaws, means mounting said jaws on said drive chains facing away from said drive chains and with the spacing of said jaws along said drive chains being the same and said jaws being disposed in transversely aligned and opposed relation as said jaws move along said runs, said mounting means including a support for each of said jaws pivotally carried by a respective one of said drive chains, and means resiliently urging said support away from its respective drive chain in the plane of said drive chains, said jaws being disposed in advance of their connections with said drive chains whereby the resistance to movement by a tube increases the clamping force of the jaws engaged with the tube.

2. A tube driving mechanism for driving a thin wall tube subject to collapse and distortion from external pressures applied thereto, said mechanism comprising a pair of endless drive chains disposed in a common plane and having opposed runs, said runs having having first portions disposed in converging relation and second portions disposed in parallel relation, means supporting and driving said drive chains in unison, and tube gripping means carried by said drive chains, said tube gripping means including a plurality of generally semi-cylindrical jaws, means mounting said jaws on said drive chains facing away from said drive chains and with the spacing of said jaws along said drive chains being the same and said jaws being disposed in transversely aligned and opposed relation as said jaws move along said runs, said mounting means including a mounting bracket for each of said jaws fixedly carried by its respective drive chain, a pivot pin carried by said mounting bracket, a jaw support pivotally mounted on said pivot pin for swinging in a plane parallel to the plane of said drive chains, a stop pin carried by said mounting bracket and engageable with said jaw support to limit swinging of said jaw support relative to said mounting bracket, and a spring extending between said mounting bracket and said jaw support resiliently urging a respective jaw away from its associated drive chain with the movement of said respective jaw being limited by engagement of said jaw support with said stop pin.

3. The tube driving mechanism of claim 2 wherein said mounting bracket includes a pair of spaced plates having aligned openings receiving said pivot pin and said stop pin and with said jaw support being disposed intermediate said spaced plates, a generally C-shaped plate disposed normal to the planes of said spaced plates, said C-shaped plate having legs secured to said spaced plates, and said spring bearing against said C-shaped plate.

4. The tube driving mechanism of claim 2 wherein said mounting bracket includes a pair of spaced plates having aligned openings receiving said pivot pin and said stop pin and with said jaw support being disposed intermediate said spaced plates, said plates having attaching ears extending in opposite directions and lying in a plane normal to the planes of said plates, adjacent link elements of said drive chains having similar attaching ears, and securing means securing respective pairs of attaching ears together.

5. The tube driving mechanism of claim 2 wherein said mounting bracket includes a pair of spaced plates having aligned openings receiving said pivot pin and said stop pin and with said jaw support being disposed intermediate said spaced plates, said plates having attaching ears extending in opposite directions and lying in a plane normal to the planes of said plates, adjacent link elements of said drive chains having similar attaching ears, and securing means securing respective pairs of attaching ears together, a generally C-shaped plate disposed normal to the planes of said spaced plates, said C-shaped plate having legs secured to said spaced plates, and said spring bearing against said C-shaped plate, said securing means also securing said C-shaped plate in place.

6. A tube driving mecahnism comprising a pair of endless drive chains having opposed runs, means supporting and driving said drive chains in unison, a plurality of jaws carried by each of said drive chains with said jaws being arranged in opposed aligned relation when passing along said runs, and means mounting said jaws for pivoting relative to said drive chains in the plane of said runs, said jaws being disposed in advance of and offset from said mounting means whereby the resistance to movement of a tube increases the clamping force of the jaws on the tube.

7. The tube driving mechanism of claim 6 together with stop means for limiting swinging of said jaws together to prevent the crushing of a tube disposed therebetween.

8. The tube driving mechanism of claim 6 together with means resiliently urging said jaws away from said drive chains to assure the resilient engagement of said jaws with a tube.

9. The tube driving mechanism of claim 6 wherein said mounting means includes a mounting bracket for each of said jaws carried by its respective drive chain, a pivot pin carried by said mounting bracket, a jaw support pivotally mounted on said pivot pin for swinging in a plane parallel to the plane of said drive chains, a stop pin carried by said mounting bracket and engageable with said jaw support to limit swinging of said jaw support relative to said mounting bracket, and a spring extending between said mounting bracket and said jaw support resiliently urging a respective jaw away from its associated drive chain with the movement of said respective jaw being limited by engagement of said jaw support with said stop pin.

10. The tube driving mechanism of claim 9 wherein said mounting bracket includes a pair of spaced plates having aligned openings receiving said pivot pin and said stop pin and with said jaw support being disposed intermediate said spaced plates, a generally C-shaped plate disposed normal to the planes of said spaced plates, said C-shaped plate having legs secured to said spaced plates, and said spring bearing against said C-shaped plate.

11. The tube driving mechanism of claim 9 wherein said mounting bracket includes a pair of spaced plates having aligned openings receiving said pivot pin and said stop pin and with said jaw support being disposed intermediate said spaced plates, said plates having attaching ears extending in opposite directions and lying in a plane normal to the planes of said plates, adjacent link elements of said drive chains having similar attaching ears, and securing means securing respective pairs of attaching ears together.

12. The tube driving mechanism of claim 9 wherein said mounting bracket includes a pair of spaced plates having aligned openings receiving said pivot pin and said stop pin and with said jaw support being disposed intermediate said spaced plates, said plates having attaching ears extending in opposite directions and lying in a plane normal to the planes of said plates, adjacent link elements of said drive chains having similar attaching ears, and securing means securing respective pairs of attaching ears together, a generally C-shaped plate disposed normal to the planes of said spaced plates, said C-shaped plate having legs secured to said spaced plates, and said spring bearing against said C-shaped plate, said securing means also securing said C-shaped plate in place.

13. A mounting assembly for mounting a tube driving jaw on a drive chain, said mounting assembly comprising a mounting bracket, means for securing said mounting bracket on the drive chain, a pivot pin carried by said mounting bracket, a jaw support pivotally mounted on said pivot pin for swinging movement towards and away from said mounting bracket, a stop pin carried by said mounting bracket and engageable with said jaw support to limit the swinging of said jaw support relative to said mounting bracket, and a spring extending between said jaw support and said mounting bracket resiliently urging said jaw support away from said mounting bracket with the movement of said jaw support being limited by engagement of said jaw support with said stop pin.

14. The mounting assembly of claim 13 wherein said mounting bracket includes a pair of spaced plates having aligned openings receiving said pivot pin and said stop pin and with said jaw support being disposed intermediate said spaced plates, a generally C-shaped plate disposed normal to the planes of said spaced plates, said C-shaped plate having legs secured to said spaced plates, and said spring bearing against said C-shaped plate.

15. A tube driving mechanism for driving a thin wall tube subject to collapse and distortion from external pressures applied thereto, said mechanism comprising a pair of endless drive chains disposed in a common plane and having opposed runs, said runs having first portions disposed in converging relation and second portions disposed in parallel relation, means supporting and driving said drive chains in unison, and tube gripping means carried by said drive chains, said tube gripping means including a plurality of generally semi-cylindrical jaws, means mounting said jaws on said drive chains facing away from said drive chains and with the spacing of said jaws along said drive chains being the same and said jaws being disposed in transversely aligned and opposed relation as said jaws move along said runs, said mounting means including a support for each of said jaws pivotally carried by a respective one of said drive chains, means resiliently urging said support away from its responsive drive chain in the plane of said drive chains, said drive chains supporting and driving means including first and second terminal sprockets for each drive chain, said first sprockets having opposed portions spaced apart a greater distance than opposed portions of said second sprockets, an intermediate sprocket for each of said drive chains at the intersection of the respective first and second run portions, the spacing between opposed portions of said intermediate sprockets being the same as that between said second sprockets, and a combination drive chain guide and back-up member extending between each of said intermediate sprockets and a respective second sprocket.

References Cited in the file of this patent

UNITED STATES PATENTS

| | | |
|---|---|---|
| 2,438,448 | Morton et al. | Mar. 23, 1948 |
| 2,679,924 | Powell | June 1, 1954 |
| 2,875,890 | Good | Mar. 3, 1959 |

FOREIGN PATENTS

| | | |
|---|---|---|
| 307,367 | Great Britain | Mar. 1, 1929 |